(12) United States Patent
Takakura

(10) Patent No.: US 9,008,980 B2
(45) Date of Patent: Apr. 14, 2015

(54) POWER CONSUMPTION DISPLAY APPARATUS AND POWER CONSUMPTION DISPLAY METHOD

(71) Applicant: Sharp Kabushiki Kaisha, Osaka (JP)

(72) Inventor: Masaki Takakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 381 days.

(21) Appl. No.: 13/669,593

(22) Filed: Nov. 6, 2012

(65) Prior Publication Data

US 2013/0144452 A1    Jun. 6, 2013

(30) Foreign Application Priority Data

Dec. 6, 2011    (JP) .................. 2011-266667

(51) Int. Cl.
*G05B 11/01*    (2006.01)
*G06F 11/30*    (2006.01)
*G06F 11/32*    (2006.01)

(52) U.S. Cl.
CPC ............ *G05B 11/01* (2013.01); *G06F 11/3062* (2013.01); *G06F 11/323* (2013.01)

(58) Field of Classification Search
CPC .... G06F 11/3062; G06F 11/323; G05B 11/01
USPC ....................... 700/291; 702/60–63
See application file for complete search history.

(56) References Cited

U.S. PATENT DOCUMENTS

| | | | | |
|---|---|---|---|---|
| 6,622,097 | B2 * | 9/2003 | Hunter ............................ | 702/61 |
| 8,082,454 | B2 * | 12/2011 | Totten ........................... | 713/300 |
| 8,311,754 | B2 * | 11/2012 | Alles .............................. | 702/61 |
| 8,704,678 | B2 * | 4/2014 | Wang et al. .............. | 340/870.01 |

(Continued)

FOREIGN PATENT DOCUMENTS

| | | |
|---|---|---|
| JP | 2002-182806 A | 6/2002 |
| JP | 2005-045948 | 2/2005 |

(Continued)

OTHER PUBLICATIONS

M Bodart, A De Herde, Global energy savings in offices buildings by the use of daylighting, Energy and Buildings, vol. 34, Issue 5, Jun. 2002, pp. 421-429, ISSN 0378-7788, http://dx.doi.org/10.1016/S0378-7788(01)00117-7. (http://www.sciencedirect.com/science/article/pii/S0378778801001177).*

(Continued)

*Primary Examiner* — Michael D Masinick
(74) *Attorney, Agent, or Firm* — Renner, Otto, Boisselle & Sklar, LLP

(57) ABSTRACT

A display is estimating every day working time of a worker involved in a load based on power consumption data in which electricity supplied to the load is measured in a certain period; calculating power consumption of the load during working time a day to calculate an average of the power consumption in a predetermined period; and calculating estimated daily power saving for every day based on a difference between maximum power during working time a day and power for each of the time, in which an index in which a proportion of the daily estimated power saving to a sum of the estimated electric saving and the power consumption serves as a parameter while a proportion of the power consumption a day to an average of the power consumption in a predetermined period serves as another parameter is displayed with the measured power consumption for each of the time.

4 Claims, 11 Drawing Sheets

(56) References Cited

U.S. PATENT DOCUMENTS

| | | | |
|---|---|---|---|
| 8,849,695 B2* | 9/2014 | Lee et al. ...................... | 705/14.1 |
| 2009/0195349 A1* | 8/2009 | Frader-Thompson et al. | 340/3.1 |
| 2011/0004575 A1* | 1/2011 | Yang et al. ...................... | 706/12 |
| 2011/0040990 A1* | 2/2011 | Chan et al. .................... | 713/300 |
| 2013/0046703 A1* | 2/2013 | Ambati et al. ................ | 705/319 |

FOREIGN PATENT DOCUMENTS

| | | |
|---|---|---|
| JP | 2007-078432 A | 3/2007 |
| JP | 2008-077345 | 4/2008 |

OTHER PUBLICATIONS

Hendron, Robert, et al. "Development of an energy savings benchmark for all residential end-uses." Proceedings of SimBuild (2004): 4-6.*

Darby, Sarah. "The effectiveness of feedback on energy consumption." A Review for DEFRA of the Literature on Metering, Billing and direct Displays 486 (2006): 2006.*

Komor, Paul, W. Kempton, and Jeff Haberl. "Energy Use, Information, and Behavior in Small Commercial Buildings." PU/CEES Report 240 (1989).*

Dobson, John K., and JD Anthony Griffin. "Conservation effect of immediate electricity cost feedback on residential consumption behavior." Proceedings of the 7th ACEEE summer study on energy efficiency in buildings 2 (1992).*

Zhang, Teresa W., and David A. Dornfeld. "Energy use per worker-hour: Evaluating the contribution of labor to manufacturing energy use." Advances in Life Cycle Engineering for Sustainable Manufacturing Businesses. Springer London, 2007. 189-193.*

* cited by examiner

| ELECTRIC ENERGY | TIME |
|---|---|
| 4 | 0:00 |
| 5 | 1:00 |
| 6 | 2:00 |
| 3 | 3:00 |
| 2 | 4:00 |
| 2 | 5:00 |
| 2 | 6:00 |
| 3 | 7:00 |
| 97 | 8:00 |
| 109 | 9:00 |
| 46 | 10:00 |
| 73 | 11:00 |
| 84 | 12:00 |
| 87 | 13:00 |
| 46 | 14:00 |
| 61 | 15:00 |
| 71 | 16:00 |
| 102 | 17:00 |
| 111 | 18:00 |
| 85 | 19:00 |
| 22 | 20:00 |
| 11 | 21:00 |
| 9 | 22:00 |
| 11 | 23:00 |

| TAP ID | DATE | 0:00 (Wh) | 1:00 (Wh) | 2:00 (Wh) | ... | 22:00 (Wh) | 23:00 (Wh) |
|---|---|---|---|---|---|---|---|
| A-01 | 2011/6/10 | 131 | 78 | 46 | ... | 113 | 46 |
| A-02 | 2011/6/10 | 58 | 17 | 3 | ... | 2 | 2 |
| A-03 | 2011/6/10 | 1 | 1 | 1 | ... | 1 | 1 |
| A-01 | 2011/6/11 | 102 | 41 | 0 | ... | 1 | 1 |
| A-02 | 2011/6/11 | 127 | 77 | 68 | ... | 84 | 127 |
| A-03 | 2011/6/11 | 4 | 5 | 6 | ... | 9 | 11 |
| A-01 | 2011/6/12 | 49 | 47 | 47 | ... | 131 | 2 |
| A-02 | 2011/6/12 | 2 | 2 | 2 | ... | 60 | 2 |
| A-03 | 2011/6/12 | 1 | 1 | 1 | ... | 0 | 85 |
| A-01 | 2011/6/13 | 1 | 1 | 1 | ... | 97 | 1 |
| A-02 | 2011/6/13 | 92 | 90 | 89 | ... | 12 | 4 |
| A-03 | 2011/6/13 | 2 | 2 | 4 | ... | 5 | 6 |

| TAP ID | DATE | WARNING MARK | 0:00 (Wh) | 1:00 (Wh) | 2:00 (Wh) | ... | 22:00 (Wh) | 23:00 (Wh) |
|---|---|---|---|---|---|---|---|---|
| A-01 | 2011/6/10 | × | 131 | 78 | 46 | ... | 113 | 46 |
| A-02 | 2011/6/10 | △ | 58 | 17 | 3 | ... | 2 | 2 |
| A-03 | 2011/6/10 |  | 1 | 1 | 1 | ... | 1 | 1 |
| A-04 | 2011/6/10 | △ | 102 | 41 | 0 | ... | 1 | 1 |
| A-05 | 2011/6/10 | × | 127 | 77 | 68 | ... | 84 | 127 |
| A-06 | 2011/6/11 | ○ | 4 | 5 | 6 | ... | 9 | 11 |
| A-01 | 2011/6/11 | ○ | 49 | 47 | 47 | ... | 131 | 2 |
| A-02 | 2011/6/11 | ○ | 2 | 2 | 2 | ... | 60 | 2 |
| A-03 | 2011/6/11 | × | 1 | 1 | 1 | ... | 0 | 85 |
| A-04 | 2011/6/11 | × | 1 | 1 | 1 | ... | 97 | 1 |
| A-05 | 2011/6/11 | △ | 92 | 90 | 89 | ... | 12 | 4 |
| A-06 | 2011/6/11 | ○ | 2 | 2 | 4 | ... | 5 | 6 |

M2 ↗   T1 ↘

POWER CONSUMPTION DISPLAY APPARATUS AND POWER CONSUMPTION DISPLAY METHOD

CROSS-NOTING PARAGRAPH

This non-provisional application claims priority under 35 U.S.C. §119(a) on Patent Application No. 2011-266667 filed in JAPAN on Dec. 6, 2011, the entire contents of which are hereby incorporated herein by reference.

FIELD OF THE INVENTION

The present invention relates to a power consumption display apparatus and a power consumption display method for displaying a measured value of power consumption.

BACKGROUND OF THE INVENTION

As means for measuring instantaneous power and electric energy of electricity used, a so-called power measurement tap that is a tap to which a load such as a personal computer is connected has been known for obtaining instantaneous power as an average value for each constant time interval by means of a microcomputer with detected voltage and current subjected to digital conversion, followed by integration of such instantaneous power, to calculate electric energy.

It is possible to measure power consumption for each individual in a company or the like with use of the power measurement tap, and it is possible to examine whose power consumption is high, which is different from the method for measuring a total sum of power consumption with use of an electric power meter installed in a distribution panel by a power company as disclosed in Japanese Laid-Open Patent Publication No. 2005-45948.

Further, conventionally, individual power consumption measured by a power measurement tap has been displayed in a graph or a table to analyze whether electricity is not wastefully consumed.

However, allowable power consumption differs depending on a business content, individual power consumption of electrical machinery and apparatus used, the number of devices and the like, and when only power consumption is simply displayed, it is impossible to judge whether to wastefully use electricity.

SUMMARY OF THE INVENTION

An object of the present invention is to provide a power consumption display apparatus and a power consumption display method capable of judging whether or not a worker tries to save on electricity regardless of whether electricity used is high or low.

An object of the present invention is to provide a power consumption display method comprising the steps of: estimating every day a clock-in time and a clock-out time of a worker involved in a load with a change in daily power consumption based on power consumption data in which electricity that is supplied to the load is measured in a certain period of time; calculating power consumption of the load during working time a day based on the clock-in time and the clock-out time to calculate an average of the power consumption of the load during working time a day in a predetermined period of time; estimating, based on a difference between maximum power consumption during working time a day and power consumption for each of the time, an estimated value of electric power saving for each of the time to accumulate the estimated value for the working time for calculation every day as daily estimated electric power saving; calculating a proportion of the daily estimated electric power saving to a sum of the estimated electric power saving and the power consumption during working time a day as a first parameter, while calculating a proportion of the power consumption during working time a day to an average of power consumption during working time a day in a predetermined period of time as a second parameter; and displaying a power-saving effort evaluation index based on the first parameter and the second parameter calculated with the measured power consumption of each of the time a day of a corresponding date.

Another object of the present invention is to provide the power consumption display method, wherein the displaying step includes a step of comparing the first parameter and the second parameter to predetermined thresholds, respectively, to display a mark indicating an evaluation level as the power-saving effort evaluation index.

Another object of the present invention is to provide the power consumption display apparatus comprising: a clock-in/out time calculation portion for estimating every day a clock-in time and a clock-out time of a worker involved in a load with a change in daily power consumption based on power consumption data in which electricity that is supplied to the load is measured in a certain period of time; a power consumption calculation portion for calculating power consumption of the load during working time a day based on the clock-in time and the clock-out time to calculate an average of the power consumption of the load during working time a day in a predetermined period of time; an electric power saving calculation portion for estimating, based on a difference between maximum power consumption during working time a day and power consumption for each of the time, an estimated value of electric power saving for each of the time to accumulate the estimated value for the working time for calculation every day as daily estimated electric power saving; an evaluation portion for calculating a proportion of the daily estimated electric power saving to a sum of the estimated electric power saving and the power consumption during working time a day as a first parameter, while calculating a proportion of the power consumption during working time a day to an average of power consumption during working time a day in a predetermined period of time as a second parameter; and a display portion for displaying a power-saving effort evaluation index based on the first parameter and the second parameter calculated with the measured power consumption of each of the time a day of a corresponding date.

Another object of the present invention is to provide the power consumption display apparatus, wherein the display portion includes a step of comparing the first parameter and the second parameter to predetermined thresholds, respectively, to display a mark indicating an evaluation level as the power-saving effort evaluation index.

BRIEF DESCRIPTION OF THE DRAWINGS

FIG. 7 is a diagram showing another example of power consumption display by the display apparatus of FIG. 1;

PREFERRED EMBODIMENTS OF THE INVENTION

Figure 1:
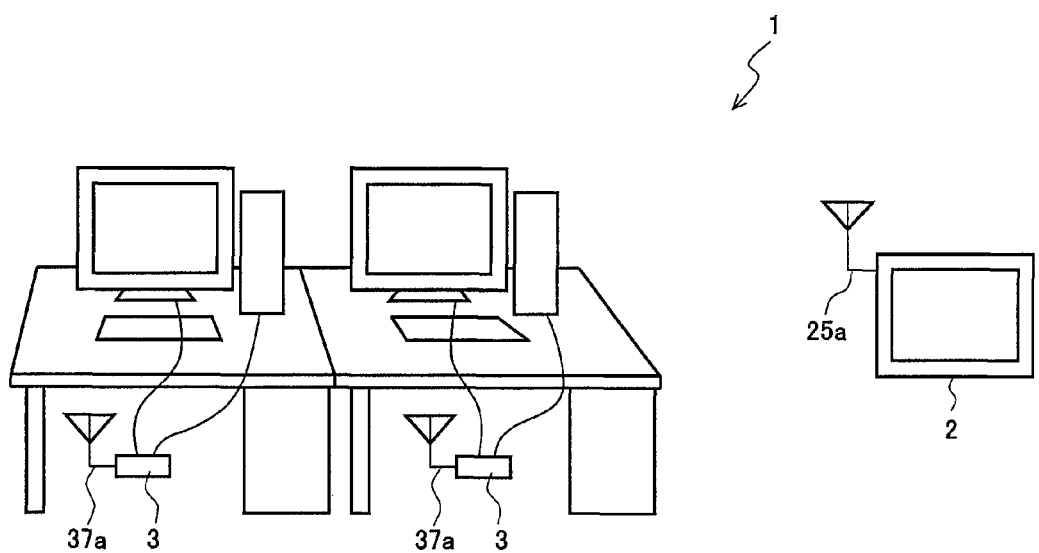
FIG. 1 is a diagram schematically showing a configuration example of a power consumption display system including a power consumption display apparatus of the present invention.

FIG. 1 is a diagram schematically showing a configuration example of a power consumption display system including a power consumption display apparatus of the present invention.

The power consumption display system illustrated by a referential numeral 1 in FIG. 1 is provided with a power consumption display apparatus (hereinafter, abbreviated as a display apparatus) 2 displaying power consumption of a load such as a personal computer, and a power measurement tap 3 supplying electricity to the load as well as measuring the electricity.

The display apparatus 2 and the power measurement tap 3 have radio antennas 25a and 37a incorporated therein, respectively, and power consumption data is sent from the power measurement tap 3 to the display apparatus 2 by radio communication via the radio antennas 25a and 37a. In the display apparatus 2, power consumption is displayed based on the power consumption data.

Figure 2:
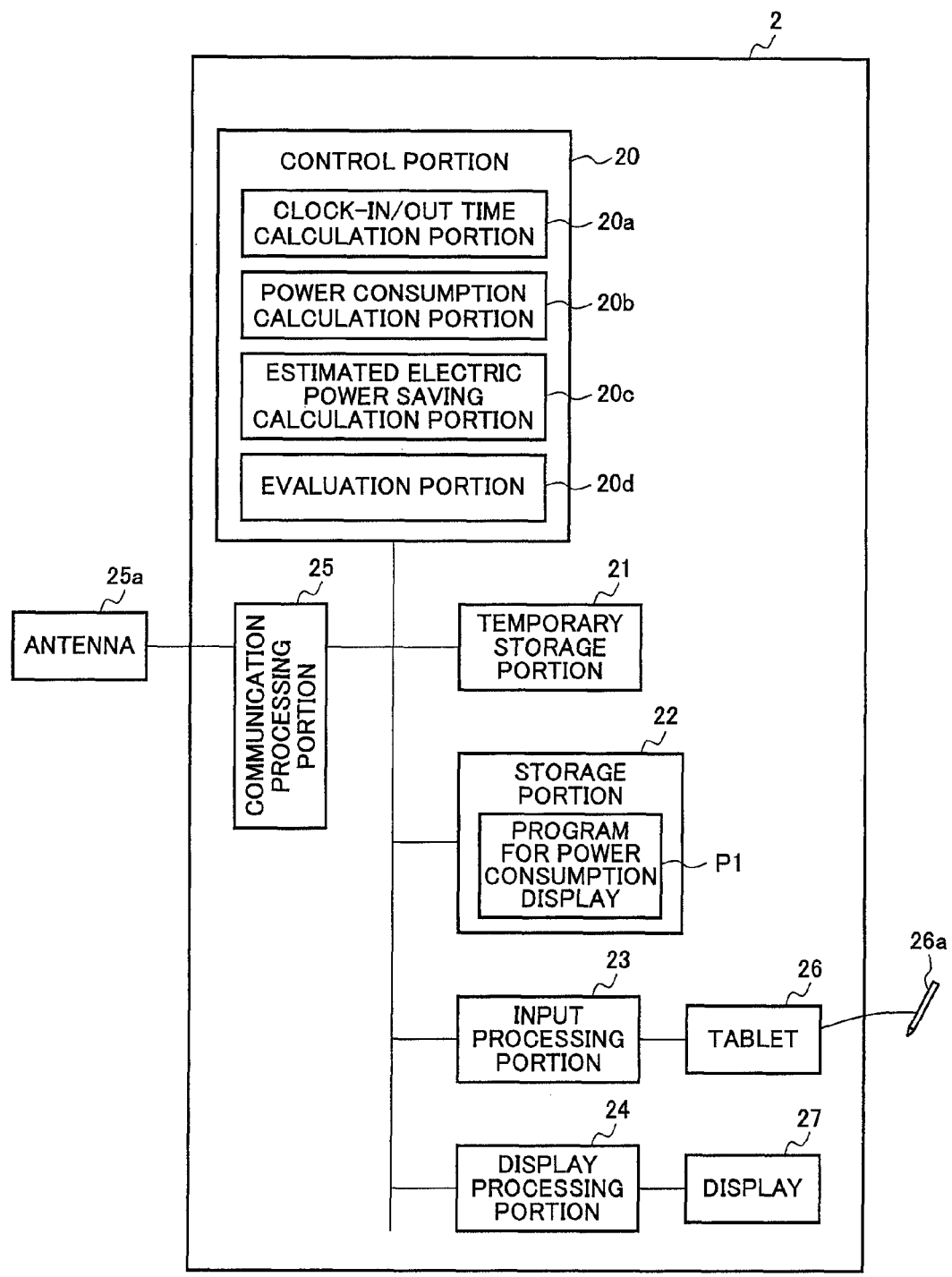
FIG. 2 is a block diagram showing an exemplary internal configuration of the display apparatus of FIG. 1.

FIG. 2 is a block diagram showing an exemplary internal configuration of the display apparatus 2 of FIG. 1.

The display apparatus 2 is provided with a control portion 20, a temporary storage portion 21, a storage portion 22, an input processing portion 23, a display processing portion 24, a communication processing portion 25, a tablet 26 and a display 27. Note that, the display apparatus 2 may be an apparatus dedicated for display of power consumption, or a general-purpose personal computer.

The control portion 20 uses a CPU (Central Processing Unit) to read to the temporary storage portion 21 and execute various programs such as a program for power consumption display P1 that is stored in the storage portion 22, thereby controlling operation of each portion of the display apparatus 2.

Note that, a clock-in/out time calculation portion 20a, a power consumption calculation portion 20b, an estimated electric power saving calculation portion 20c and an evaluation portion 20d included in the control portion 20 will be described below.

For the temporary storage portion 21, a RAM (Random Access Memory), for example, a SRAM (Static RAM) or a DRAM (Dynamic RAM) is used. In the temporary storage portion 21, a program read as described above is stored, while information generated by processing of the control portion 20 is stored.

For the storage portion 22, a hard disk, an SSD (Solid State Drive) or the like is used. In the storage portion 22, the program for power consumption display P1 is stored. Additionally, another application software program in a graph display apparatus 1 may be stored as a matter of course.

To the input processing portion 23, the tablet 26 for receiving input with a pen 26a is connected. The input processing portion 23 receives information such as information of pressing a button that is input by an operation of a user of the display apparatus 2 and information of a coordinate showing a position in a screen for informing the control portion 20.

To the display processing portion 24, the display 27 using a liquid crystal display or the like is connected. The display 27 corresponds to a "display portion" of the present invention. The control portion 20 outputs an application screen for graph display of power consumption onto the display 27 via the display processing portion 24 to display an image in the application screen.

To the communication processing portion 25, the radio antenna 25a is connected for performing radio communication. Note that, for a communication protocol for sending and receiving power consumption data by the radio antenna 25a, a protocol such as ZigBee may be used. The communication protocol is not limited thereto.

Figure 3:
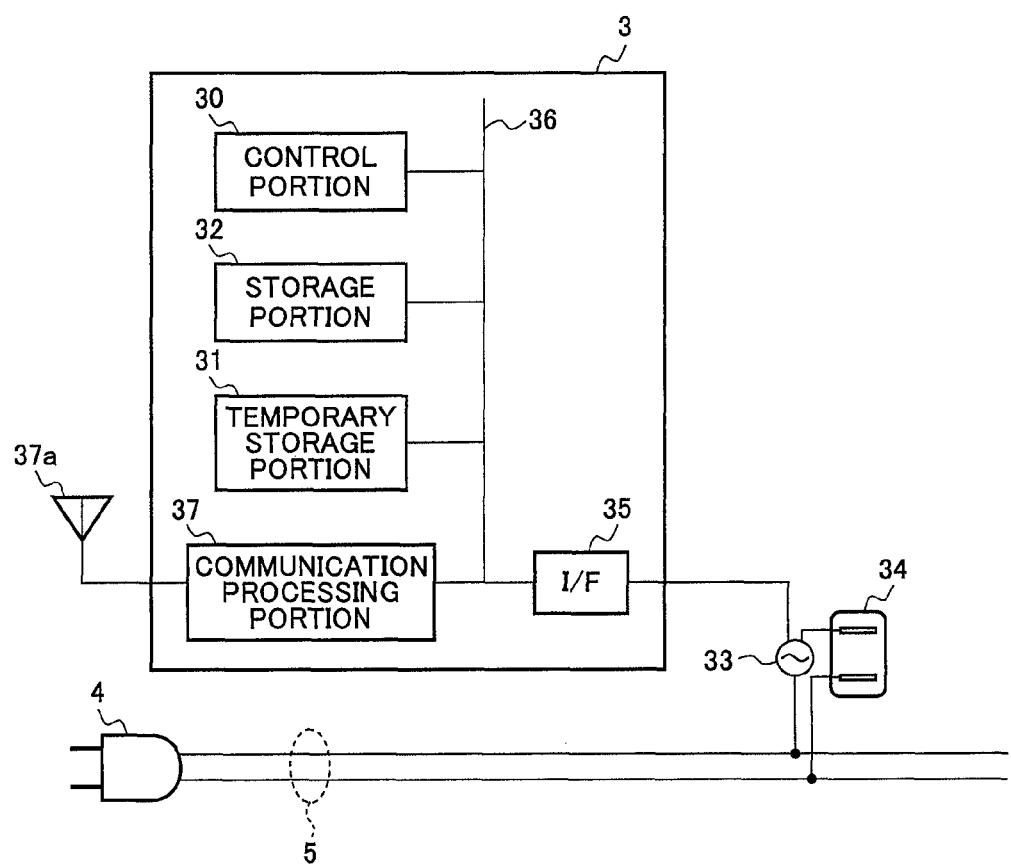
FIG. 3 is a diagram showing a configuration example of a power measurement tap of FIG. 1.

FIG. 3 is a diagram showing a configuration example of the power measurement tap 3 of FIG. 1.

The power measurement tap 3 is provided with a control portion 30, a temporary storage portion 31, a storage portion 32, an ammeter 33, an outlet 34, an interface circuit (I/F) 35, an internal bus 36 and a communication processing portion 37.

The control portion 30 reads to the temporary storage portion 31 and executes a program that is stored in the storage portion 32, thereby controlling operation of each portion of the power measurement tap 3.

For the temporary storage portion 31, a RAM is used. In the temporary storage portion 31, a program read as described above is stored, while information generated by processing of the control portion 30 is stored. For the storage portion 32, a ROM (Read Only Memory) or the like is used.

To the power measurement tap 3, electricity is supplied by a power plug 4. Electricity runs through an electric power line 5, and passes through the ammeter 33 to be supplied to the outlet 34. A measurement value which is obtained with the ammeter 33 and subjected to digital conversion is transferred to the internal bus 36 through the interface circuit 35 of the ammeter.

To the communication processing portion 37, the radio antenna 37a is connected.

In such the power measurement tap 3, the control portion 30 generates power consumption data in which the ammeter 33 is used to measure electricity that is supplied to a load for each predetermined period of time (for example, per second) over a certain period of time (for example, one day), and sends the power consumption data to the display apparatus 2 via the radio antenna 37a upon request from the display apparatus 2.

Figures 4A, 4B:
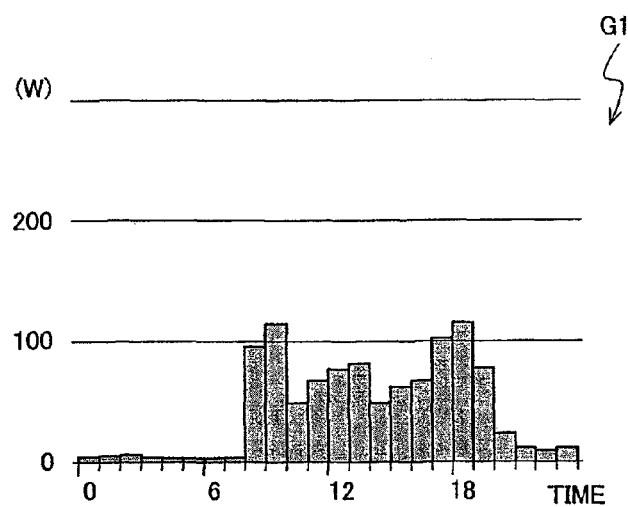
FIG. 4A and FIG. 4B are diagrams explaining an example of power consumption data that is sent from the power measurement tap to the display apparatus of FIG. 1.

FIG. 4A and FIG. 4B are diagrams explaining an example of power consumption data sent from the power measurement tap 3 to the display apparatus 2. FIG. 4A shows numerical values in a table form, in which, in power consumption data, that is, a table T1, a time of each hour between 0:00 and 23:00 is indicated in a first row, and power consumption (unit: Wh) in the time given (one hour) is indicated in a second row. A graph G1 of FIG. 4B is provided as graphed power consumption data of FIG. 4A.

Note that, hourly power consumption Wh has the same value as that of average power consumption W for that one hour. In the description below, hourly power consumption is synonymous with power consumption.

Figures 5, 6:
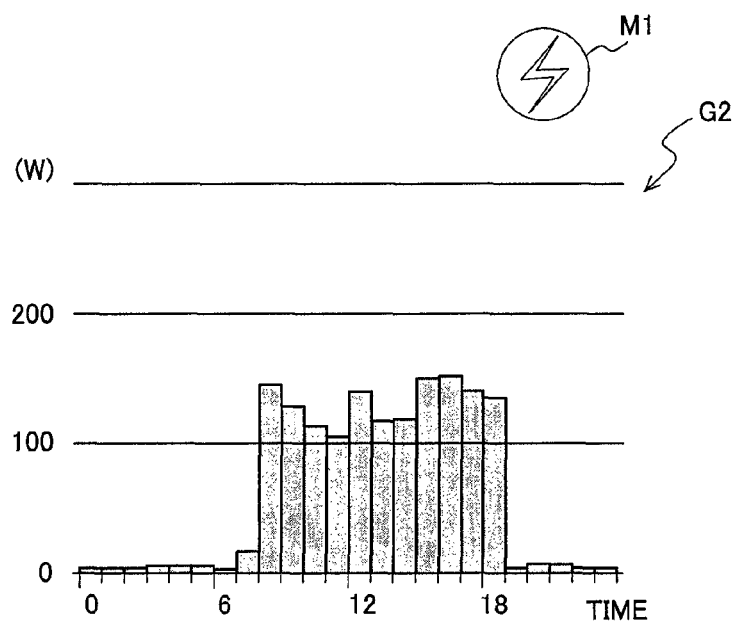
FIG. 5 is a diagram explaining an example of aggregate power consumption data in which the display apparatus of FIG. 1 aggregates power consumption data received from all power measurement taps 3.
FIG. 6 is a diagram showing an example of power consumption display by the display apparatus of FIG. 1.

FIG. 5 is a diagram explaining an example of aggregate power consumption data in which the display apparatus 2 aggregates power consumption data received from all power measurement taps 3. In the aggregate power consumption data of FIG. 5, that is a table T2, a specific number of the power measurement tap 3 is indicated in a first column, a date when electricity was measured is indicated in a second column, and power consumption (unit: Wh) is indicated in a third column and subsequent columns. In this example, data of three power measurement taps has been aggregated for four days.

In the display apparatus 2, based on the aggregate power consumption data illustrated in FIG. 5, for each load, for example, a transition of hourly power consumption a day of the power measurement tap 3 is displayed in a graph or a table.

At the time, the clock-in/out time calculation portion 20a estimates/calculates a clock-in time S and a clock-out time E of a worker involved in the power measurement tap 3 with a change in daily power consumption for the corresponding power measurement tap 3 based on the aggregate power consumption data. The clock-in time S and the clock-out time E are calculated per day of a predetermined period of time (for example, for four days) including a date when display of daily power consumption is instructed.

Additionally, the power consumption calculation portion 20b calculates total power consumption Wn during the hours between the clock-in time S and the clock-out time E, that is, working hours estimated by the clock-in/out time calculation portion 20a for each day in the predetermined period of time described above based on the aggregate power consumption data, while an average value of the power consumption Wn in the above-described predetermined period of time is calculated as the average power consumption Wt.

The estimated electric power saving calculation portion 20c estimates based on the aggregate power consumption data a difference between maximum power consumption during working hours (during working time) estimated by the clock-in/out time calculation portion 20a and actual power consumption of each of the time as electric power saving per hour, then accumulates the estimated electric power saving for working hours for calculation as daily estimated electric power saving Wd. In this manner, maximum power consumption during working hours is used as a standard since it is presumed that in a period of time during measuring maximum power consumption, all devices that are connected to the power measurement tap are powered on.

The evaluation portion 20d calculates, for a corresponding date, a proportion of the daily estimated electric power saving Wd to "a sum of the daily estimated electric power saving Wd and the power consumption Wn during working hours a day", that is, electric energy in the case of consuming electricity for working hours with estimated maximum power consumption per hour during the working hours as a first parameter Ra, as well as a proportion of the total power consumption Wn during working hours of a corresponding date to the average power consumption Wt during a predetermined period of time as a second parameter Rb.

Then, the display apparatus 2 displays, in the case of displaying power consumption on the display 27, a power-saving effort evaluation index based on the first parameter and the second parameter.

More specifically, the evaluation portion 20d calculates an evaluation value Z for daily power-saving efforts with use of the first parameter Ra and the second parameter Rb. A concrete example of the evaluation value Z will be described below.

The display apparatus 2 displays, in the case of displaying power consumption on the display 27, a varied warning mark as the power-saving effort evaluation index based on the above-described evaluation value Z.

FIG. 6 is a diagram showing an example of power consumption display by the display apparatus 2.

FIG. 6 is an example in which power consumption display is performed by graph display, and a graph G2 of the diagram graphically displays daily power consumption, in which a warning mark M1 colored differently according to the evaluation value Z is overlaid and displayed.

FIG. 7 is a diagram showing another example of power consumption display by the display apparatus 2.

FIG. 7 is an example in which power consumption display is performed in a table, and the table T1 of the diagram displays daily power consumption in a predetermined period of time in the table, in which a warning mark M2 in a shape which is different according to the evaluation value Z (for example, ○, Δ and X) is displayed in a third column.

A user views such display, and is thereby able to easily grasp whether or not to try to save on electricity properly.

Note that, a meaning of a blank warning mark column in a third row from above will be described below.

Figure 8:
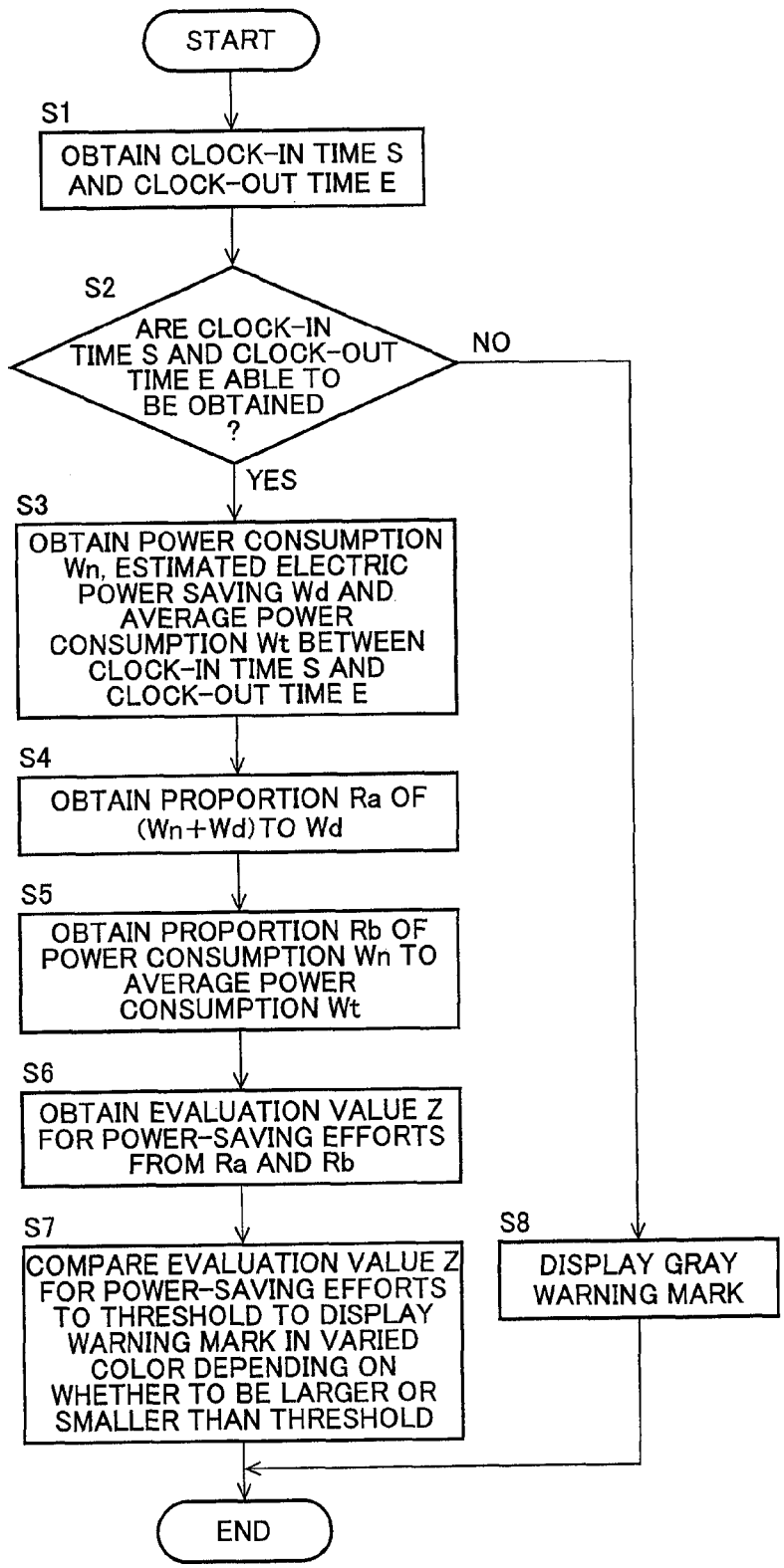
FIG. 8 is a flowchart explaining an example of graph display processing of power consumption by the display apparatus of FIG. 1.

FIG. 8 is a flowchart explaining an example of graph display processing of power consumption by the display apparatus 2.

In the display apparatus 2, in the case of receiving an instruction to graphically display a transition of daily power consumption for a certain power measurement tap 3 via the tablet 26, the clock-in/out time calculation portion 20a estimates/calculates every day the clock-in time S and the clock-out time E of a worker involved in the power measurement tap 3 in a predetermined period of time including a corresponding date based on a change in daily power consumption with reference to aggregate power consumption data (step S1), and the process goes to step S2.

At step S2, determination is made on whether the clock-in time S and the clock-out time E of the corresponding date were obtained. In the case of having been obtained (in the case of YES), the process goes to step S3, and in the case of having not been obtained (in the case of NO), the process goes to step S8. When the clock-in time S and the clock-out time E are not able to be obtained, there is supposed to be a less change in power consumption, which will be described in detail below.

At step S3, the power consumption calculation portion 20b calculates every day a total power consumption Wn from the clock-in time S to the clock-out time E estimated by the clock-in/out time calculation portion 20a, and calculates the average power consumption Wt that is an average of the power consumption Wn. Moreover, the estimated electric power saving calculation portion 20c estimates a difference between maximum power consumption during the hours between the clock-in time S and the clock-out time E estimated by the clock-in/out time calculation portion 20a and actual power consumption of each of the time as electric power saving for each of the time, and accumulates the estimated electric power saving from the clock-in time S to the clock-out time E to calculate the daily estimated electric power saving Wd, then the process goes to step S4.

At step S4, by the following formula, the evaluation portion 20*d* obtains a proportion Ra of a sum of the power consumption Wn and the daily estimated electric power saving Wd to the daily estimated electric power saving Wd, and the process goes to step S5.

$$Ra=Wd/(Wn+Wd)$$

At step S5, by the following formula, the evaluation portion 20*d* obtains a proportion Rb of the power consumption Wn to the average power consumption Wt in a predetermined period of time, and the process goes to step S6.

$$Rb=Wn/Wt$$

At step S6, with use of the following formula, the evaluation portion 20*d* obtains the evaluation value Z for power-saving efforts, and the process goes to step S7. The evaluation value Z for power-saving effort is, for example, obtained by the following formula.

In a case where the power consumption Wn is less than the average power consumption Wt, that is, in the case of Rb<1, $$Z=Ra+(1-Rb)$$

Otherwise, $$Z=Ra$$

Meanings of the above formulas will be explained separately as the following cases.

(1) In the case of daily estimated electric power saving Wd=0 and Rb≥1, Z=0

(2) In the case of daily estimated electric power saving Wd=0 and Rb<1, Z=1−Rb (3) In the case of daily estimated electric power saving Wd>0 and Rb≥1, Z=Ra (4) In the case of daily estimated electric power saving Wd>0 and Rb<1, Z=Ra+(1−Rb)

In the case of (1), because of daily estimated electric power saving Wd=0, it is believed that electricity is not tried to be saved for powering on/off of a device which is not used. Additionally, the proportion Rb of the power consumption Wn to the average power consumption Wt is 1 or more, thus supposed that an average value or more of power consumption is also used, so that the evaluation value Z for power-saving efforts comes to 0.

In the case of (2), because of daily estimated electric power saving Wd=0, it is believed that electricity is not tried to be saved for powering on/off of a device which is not used. However, the proportion Rb of the power consumption Wn to the average power consumption Wt is less than 1, thus supposed to try to suppress power consumption, so that the evaluation value Z for power-saving efforts is evaluated as 1−Rb. This value becomes high as power consumption becomes low.

In the case of (3), because of daily estimated electric power saving Wd>0, it is believed that electricity is tried to be saved for powering on/off a device which is not used. Thus, the evaluation value Z for power-saving efforts is evaluated as Ra. This value becomes high as the daily estimated electric power saving Wd becomes high.

Figure 9A:
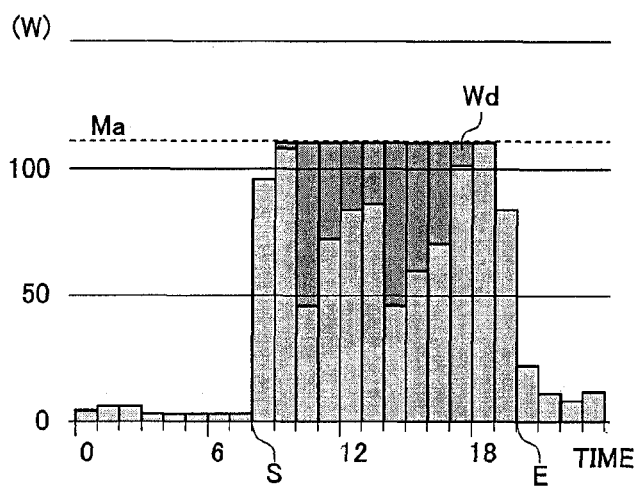
FIG. 9A to FIG. 9C are diagrams showing examples of high estimated electric power saving and low estimated electric power saving.
Figure 9B:
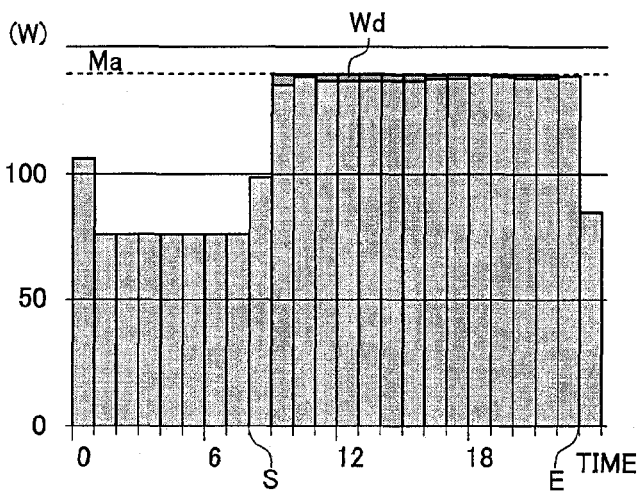
Figure 9C:
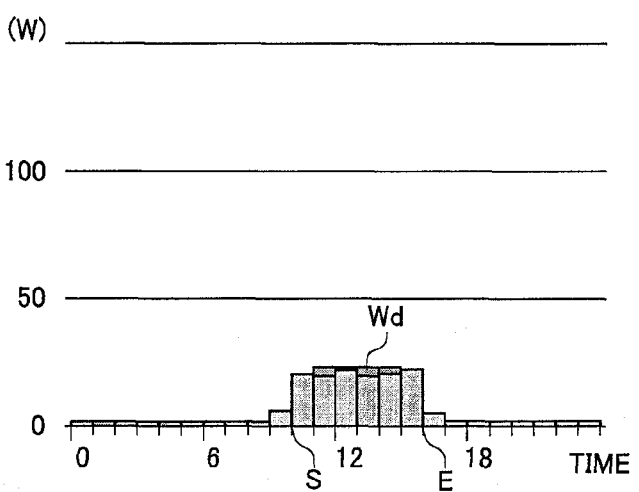

Electricity of the example of (3) is shown in FIG. 9A to FIG. 9C. In FIG. 9A to FIG. 9C, S denotes a clock-in time, E denotes a clock-out time, Ma denotes maximum power consumption during the hours between the clock-in time S and the clock-out time E and Wd denotes daily estimated electric power saving. A graph of FIG. 9A shows a case where a value of the daily estimated electric power saving Wd is high. A graph of FIG. 9B shows a case where a value of the daily estimated electric power saving Wd is low.

In the case of (4), because of daily estimated electric power saving Wd>0, it is believed that electricity is tried to be saved for powering on/off a device which is not used. Further, because power consumption is less than an average value, the evaluation value Z for power-saving efforts is evaluated as Ra+(1−Rb). This value becomes high as the daily estimated electric power saving Wd becomes high, or as power consumption becomes low. A graph of FIG. 9C shows a case where a value of the daily estimated electric power saving is low, and power consumption is also low. In this case, the evaluation value Z for power-saving efforts comes to a higher value than that of FIG. 9B.

At step S7, the display apparatus 2 renders a graph of power consumption of a designated date on the display 27, and at the time, the evaluation value Z for power-saving efforts is compared to a predetermined threshold to display a warning mark in a varied color, then the process is finished. For the above-described threshold, for example, two values of Y1 and Y2 (Y1>Y2) are set, and the warning mark may be displayed having a varied color such as green in the case of Z≥Y1, yellow in the case of Y1>Z≥Y2 or red in the case of Y2>Z. Of course, the warning mark may be displayed not only in a varied color but also with a varied symbol such as ○, Δ and X.

At step S8, the display apparatus 2 renders a graph of power consumption of a designated date on the display 27, and at the time, a gray warning mark is displayed, then the process is finished. The warning mark is colored in gray because of being differentiated in a case where a clock-in time or a clock-out time is not able to be obtained. Of course, in such a case, a method may be provided for not displaying the warning mark or displaying a varied symbol. Note that, a blank warning mark column in a third row from above of FIG. 7 is an example in which the warning mark is not displayed.

Figure 10:
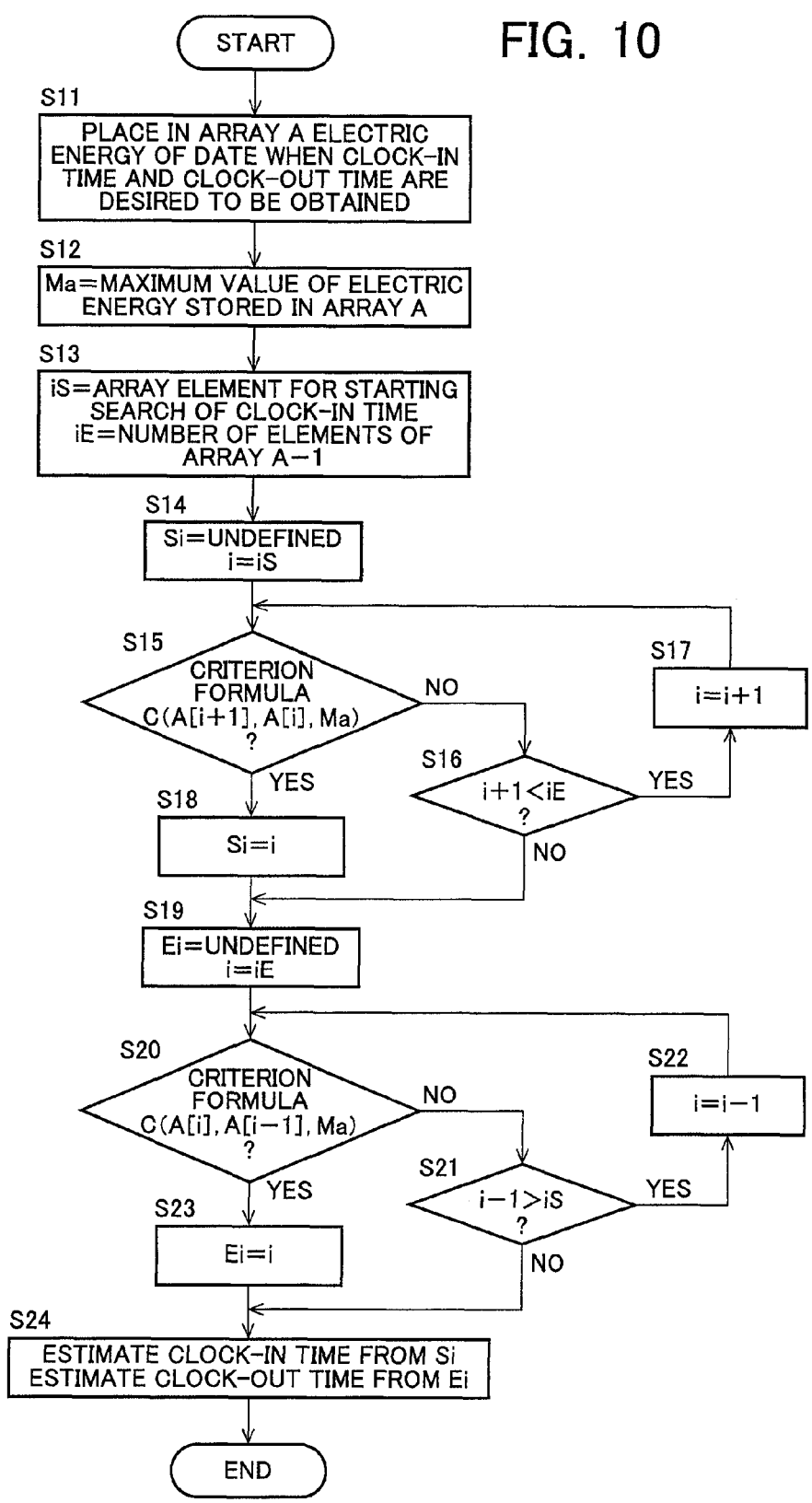
FIG. 10 is a flowchart explaining an example of estimation processing of a clock-in time and a clock-out time performed by a clock-in/out time calculation portion of FIG. 2.

FIG. 10 is a flowchart explaining an example of estimation processing of a clock-in time and a clock-out time performed by the clock-in/out time calculation portion 20*a*.

The clock-in/out time calculation portion 20*a* first places electric energy for each time zone of the day for which a clock-in time and a clock-out time are desired to be obtained in an array A (step S11). In this example, a method of storing electric energy for each time zone in the array A is provided as a method of sequentially placing an electric energy therein from that of an earlier time zone.

At step S12, a maximum value of the electric energy that is stored in the array A is obtained as Ma, and the process goes to step S13.

At step S13, an array element for starting to search a clock-in time is iS, and the number of elements of the array A−1=iE. In a case where daily power measurement is started at 0:00 a.m., supposed is also the case of getting a next day at 0:00 a.m. directly from attendance of the previous day. In such a case, the time for starting search of a clock-in time may be set to about 3:00 a.m. The time for starting search of a clock-in time may be set depending on a situation of a workplace. In this example, because of setting a method of placing in the array A electricity in the sequence that is earlier to be obtained, in the case of deciding the time for starting search of a clock-in time, a value of the array element iS is also able to be obtained. The number of elements of the array A is decided depending on a time interval for aggregating electric energy. For example, in the case of aggregating per hour as examples of FIG. 4A and FIG. 4B, the number of elements of the array is 24, and iE is 23. After iS and iE are set, the process goes to step S14.

At step S14, an array element Si corresponding to a clock-in time is undefined, and a variable i for searching a clock-in time is iS, then the process goes to step S15.

At step S15, a criterion formula C described below is used to determine whether or not a current array element corresponds to a clock-in time. In the case of correspondence (in the case of Yes), the process goes to step S18, and in the case of no correspondence, the process goes to step S16.

The criterion formula C is provided as follows, for example. Criterion formula C (a1, a2, ma)=
in the case of ma<Mn, No
in the case of ma≥Mn and |a1−a2|>ma×R, Yes
in the case of ma≥Mn and |a1−a2|≤ma×R, No Where, a1 and a2 are arguments of the criterion formula C, to each of which, an element of the array A, that is, electric energy in a certain time zone is applicable. ma is an argument of the criterion formula C, to which, maximum electric energy Ma is applicable. A constant Mn is a threshold with respect to maximum electric energy. The maximum electric energy Ma less than Mn by a first conditional expression of the criterion formula C results in No. A value of Mn may be set to a value sufficiently less than electricity when a device connected to the power measurement tap 3 is powered on. A constant R is a rate as to whether to regard as attendance in the case of measuring electricity a certain percentage higher than maximum electricity, and may be decided by adjusting values between 0 and 1.

At step S15, an argument of the criterion formula C is a1=A [i+1], a2=A [i], and ma=Ma.

Accordingly, a value of the criterion formula C is,
in the case of Ma<Mn, No;
in the case of Ma≥Mn and |A [i+1]−A [i]|>Ma×R, Yes; and
in the case of Ma≥Mn and |A [i+1]−A [i]|<Ma×R, No.

At step S16, determination is made on whether to be i+1<iE. In the case of Yes, a value of i is incremented by one at step S17, and the process returns to step S15. In the case of No, the process goes to step S19.

At step S18, i is assigned to Si, and the process goes to step S19.

At step S19, an array element Ei corresponding to a clock-out time is undefined, and a variable i for searching a clock-out time is iE, then the process goes to step S20.

At step S20, the criterion formula C is used to determine whether or not a current array element corresponds to a clock-out time. In the case of correspondence (in the case of Yes), the process goes to step S23, and in the case of no correspondence, the process goes to step S21.

At step S20, an argument of the criterion formula C is a1=A [i], a2=A [i−1] and ma=Ma.

Accordingly, a value of the criterion formula C is,
in the case of Ma<Mn, No;
in the case of Ma≥Mn and |A [i]−A [i−1]|>Ma×R, Yes; and
in the case of Ma≥Mn and |A [i]−A [i−1]|≥Ma×R, No.

At step S21, determination is made on whether to be i−1>iS. In the case of Yes, the value of i is decremented by one at step S22, and the process returns to step S20. In the case of No, the process goes to step S24.

At step S23, i is assigned to Ei, and the process goes to step S24.

Figure 11A:
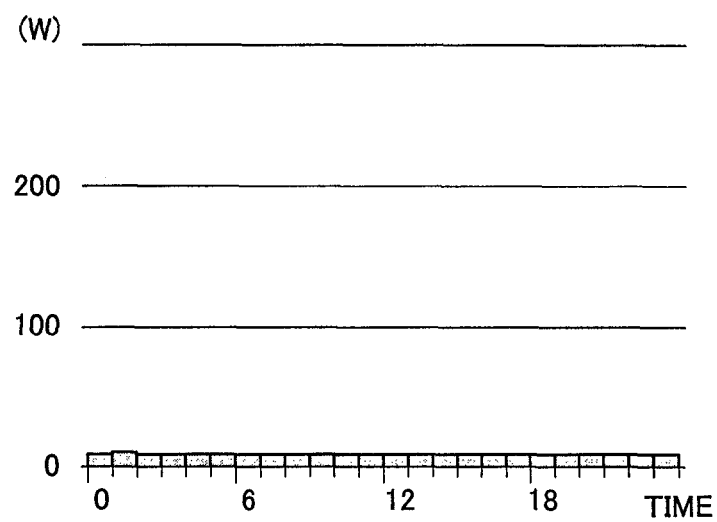
FIG. 11A and FIG. 11B are diagrams showing an example of a transition of power consumption a day in a case where the clock-in/out time calculation portion of FIG. 2 is not able to estimate a clock-in time and a clock-out time.
Figure 11B:
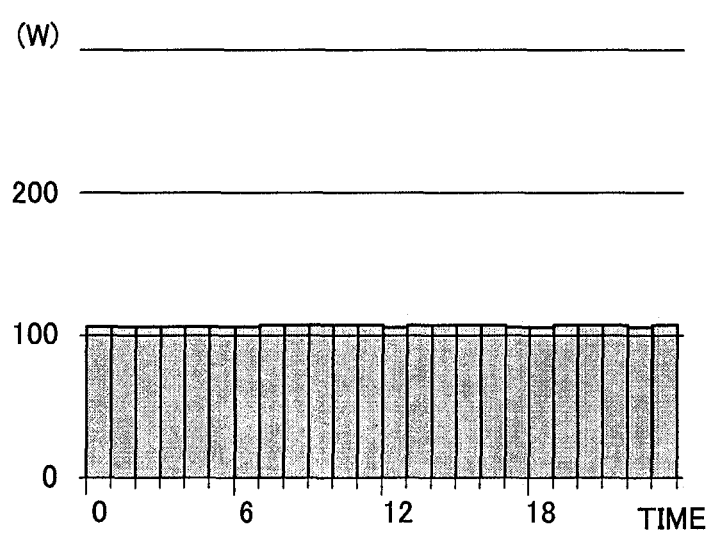

At step S24, a time zone applicable to Si is estimated as a clock-in time, and a time zone applicable to Ei is estimated as a clock-out time. At the time, Si and Ei may be undefined in some cases. In such a case, the criterion formula C results in No all the time. Such an example of electricity is shown in FIG. 11A and FIG. 11B. FIG. 11A is an example in which the maximum electric energy Ma is less than Mn. FIG. 11B shows a case where, even in the case of the maximum electric energy Ma>Mn, a change in electricity is less than Ma X R, and a criterion formula results in No.

Figure 12:
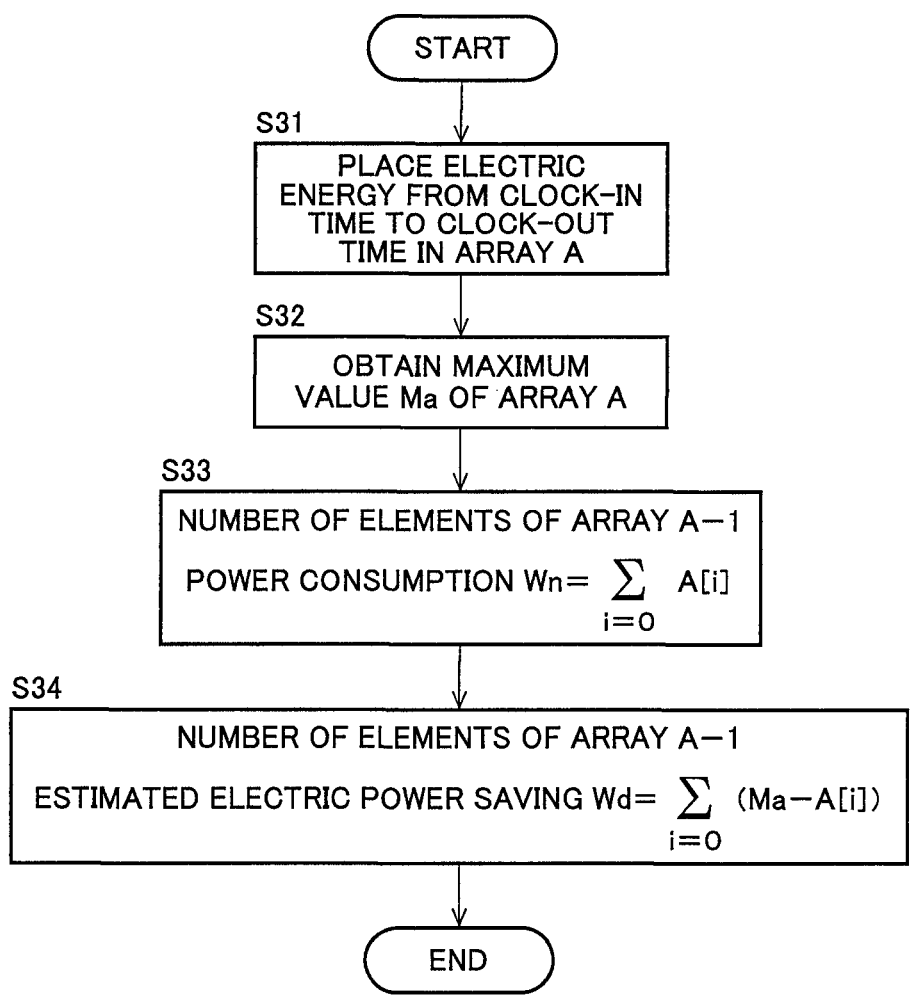
FIG. 12 is a flowchart explaining an example of calculation processing of power consumption Wn and daily estimated electric power saving in the display apparatus of FIG. 2.

FIG. 12 is a flowchart explaining an example of calculation processing of the power consumption Wn and the daily estimated electric power saving Wd in the display apparatus 2.

At step S31, in the control portion 20, at first, electric energy for each time zone from the clock-in time S to the clock-out time E of a corresponding date is placed in the array A.

At step S32, the power consumption calculation portion 20b obtains the maximum value Ma of the array A, and the process goes to step S33.

At step S33, the power consumption calculation portion 20b obtains a total sum of electric energy of the array A as the power consumption Wn, and the process goes to step S34.

At step S34, the estimated electric power saving calculation portion 20c obtains a total sum of estimated electric power saving, that is, Ma−A [i] as the estimated electric power saving Wd, and the process is finished.

In the above-described examples, a load is one or more of electronic devices which is connected to one power measurement tap, however, the present invention is applicable to a case where a group of electronic devices which are connected to a plurality of power measurement taps serve as loads, or a case where one of a plurality of electronic devices connected to one power measurement tap serves as a load.

Moreover, as described above, a power measurement tap generates power consumption data in which electricity that is supplied to the load is measured for each predetermined period of time (for example, per second) over a certain period of time (for example, one day) with use of an ammeter for sending to a display apparatus, however, data on electricity measured for each predetermined period of time described above may be sent to the display apparatus for each of the measurement so that the display apparatus generates the above-described power consumption data based on the data.

Further, as described above, an example is provided for displaying power consumption per hour, that is, average power consumption for one hour a day, however, the present invention is also applicable for the case of displaying power consumption every 30 minutes or every 15 minutes a day.

Note that, it should be understood that the embodiments disclosed herein are illustrative and not limitative in all respects. The scope of the present invention is defined by claims rather than the description above, and intended to embrace all modifications within the meaning equivalent to and the scope of the claims.

Hereinabove, in the present invention, based on a proportion of daily power consumption to estimated electric power saving in addition to a proportion of daily power consumption to an average of power consumption in a certain period of time, evaluation is made on whether or not to try to save on electricity, thus making it possible to evaluate efforts regardless of whether power consumption for each individual is high or low. Additionally, each parameter for evaluation is able to be automatically calculated from measured power consumption, thus eliminating the need for time and effort in setting even when the number of targets for power measurement is increased.

The invention claimed is:

1. A power consumption display method comprising the steps of:
  estimating every day a clock-in time and a clock-out time of a worker involved in a load with a change in daily power consumption based on power consumption data in which electricity that is supplied to the load is measured in a certain period of time;

calculating power consumption of the load during working time a day based on the clock-in time and the clock-out time to calculate an average of the power consumption of the load during working time a day in a predetermined period of time;

estimating, based on a difference between maximum power consumption during working time a day and power consumption for each of the time, an estimated value of electric power saving for each of the time to accumulate the estimated value for the working time for calculation every day as daily estimated electric power saving;

calculating a proportion of the daily estimated electric power saving to a sum of the estimated electric power saving and the power consumption during working time a day as a first parameter, while calculating a proportion of the power consumption during working time a day to an average of power consumption during working time a day in a predetermined period of time as a second parameter; and displaying a power-saving effort evaluation index based on the first parameter and the second parameter calculated with the measured power consumption of each of the time a day of a corresponding date.

2. The power consumption display method as defined in claim 1, wherein the displaying step includes a step of comparing the first parameter and the second parameter to predetermined thresholds, respectively, to display a mark indicating an evaluation level as the power-saving effort evaluation index.

3. A power consumption display apparatus comprising:

a clock-in/out time calculation portion for estimating every day a clock-in time and a clock-out time of a worker involved in a load with a change in daily power consumption based on power consumption data in which electricity that is supplied to the load is measured in a certain period of time;

a power consumption calculation portion for calculating power consumption of the load during working time a day based on the clock-in time and the clock-out time to calculate an average of the power consumption of the load during working time a day in a predetermined period of time;

an electric power saving calculation portion for estimating, based on a difference between maximum power consumption during working time a day and power consumption for each of the time, an estimated value of electric power saving for each of the time to accumulate the estimated value for the working time for calculation every day as daily estimated electric power saving;

an evaluation portion for calculating a proportion of the daily estimated electric power saving to a sum of the estimated electric power saving and the power consumption during working time a day as a first parameter, while calculating a proportion of the power consumption during working time a day to an average of power consumption during working time a day in a predetermined period of time as a second parameter; and a display portion for displaying a power-saving effort evaluation index based on the first parameter and the second parameter calculated with the measured power consumption of each of the time a day of a corresponding date.

4. The power consumption display apparatus as defined in claim 3, wherein the display portion includes a step of comparing the first parameter and the second parameter to predetermined thresholds, respectively, to display a mark indicating an evaluation level as the power-saving effort evaluation index.

* * * * *